June 9, 1942.   G. H. TOMLINSON   2,285,876
WASTE SULPHITE LIQUOR RECOVERY
Filed Jan. 26, 1938   3 Sheets-Sheet 1
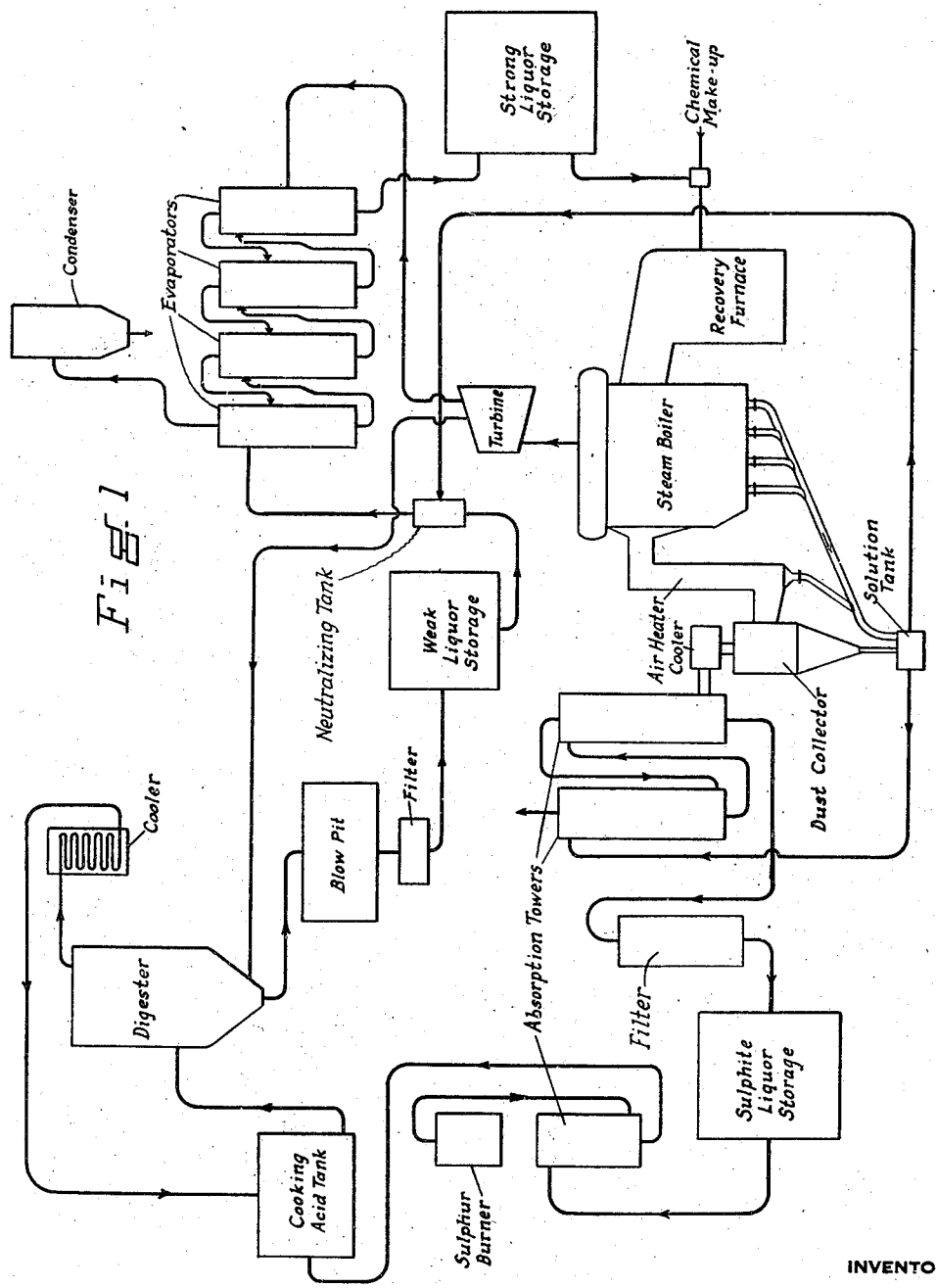
INVENTOR
George H. Tomlinson
BY
ATTORNEY

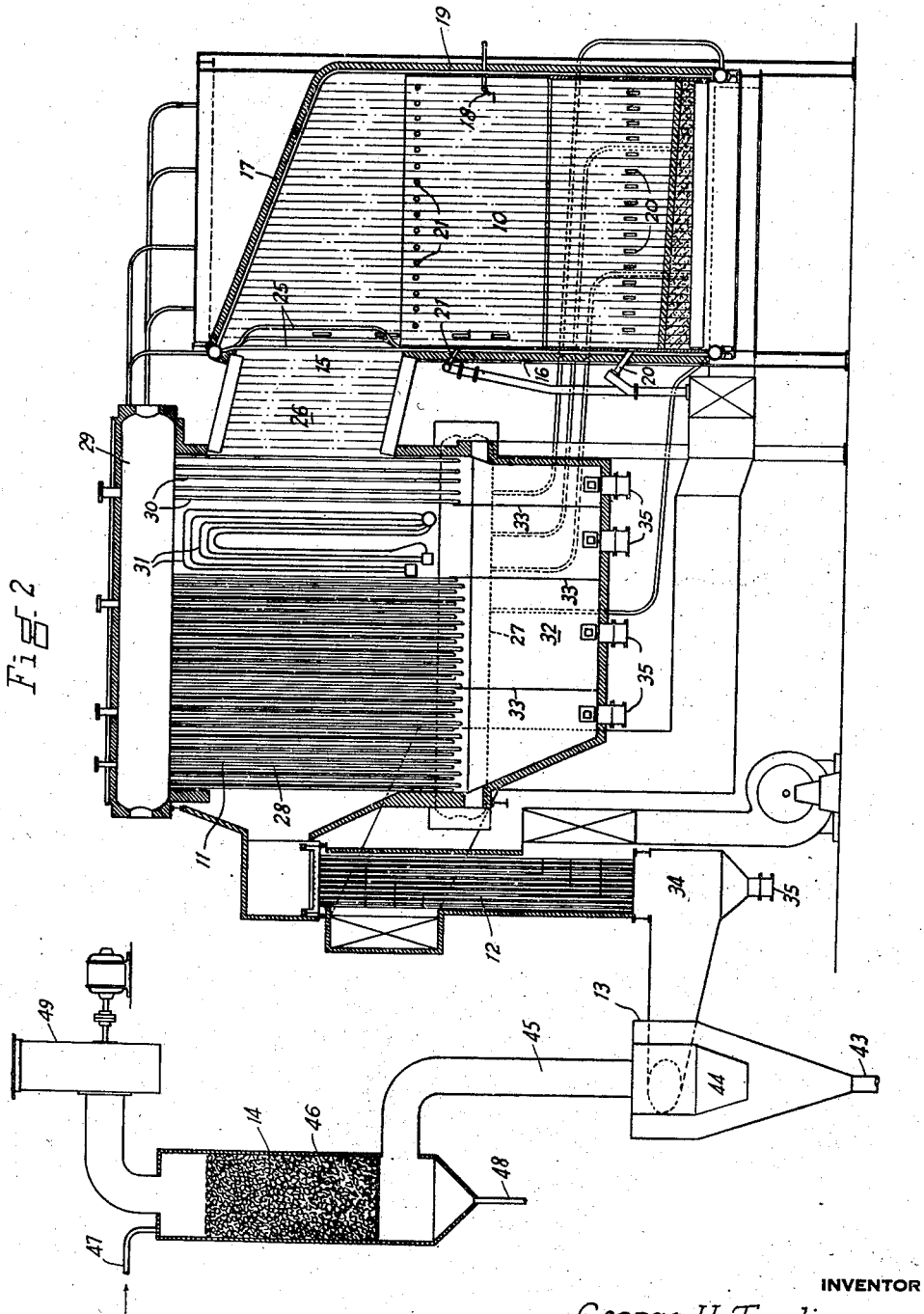

June 9, 1942.  G. H. TOMLINSON  2,285,876
WASTE SULPHITE LIQUOR RECOVERY
Filed Jan. 26, 1938   3 Sheets-Sheet 3
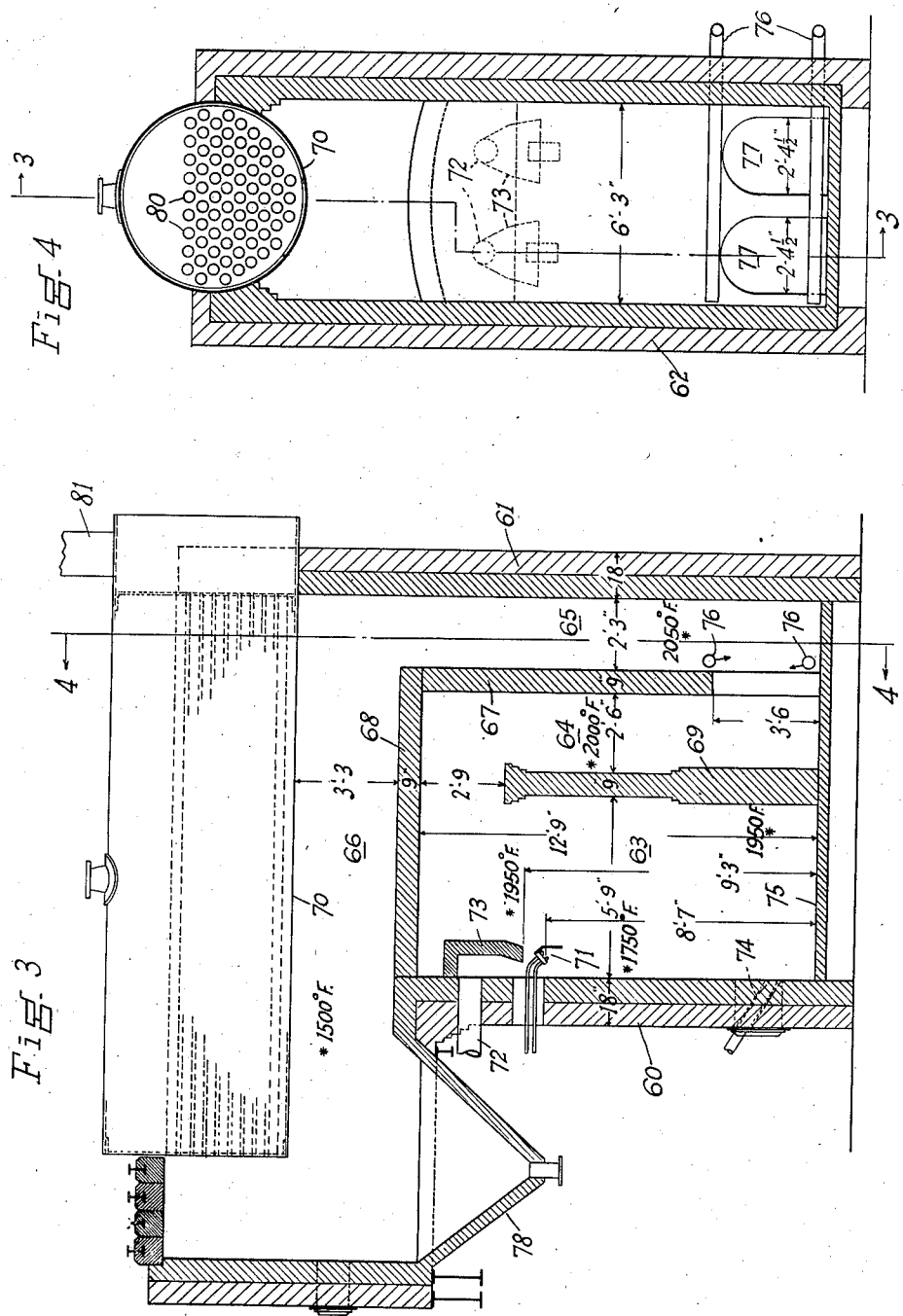
INVENTOR.
George H. Tomlinson
ATTORNEY.

Patented June 9, 1942

2,285,876

UNITED STATES PATENT OFFICE 2,285,876

WASTE SULPHITE LIQUOR RECOVERY

George H. Tomlinson, Westmount, Quebec, Canada

Application January 26, 1938, Serial No. 186,938

24 Claims. (Cl. 23—131)

The present invention relates to the manufacture of pulp from cellulosic fibrous material by the "acid" or "sulphite" process. The cooking liquid ordinarily employed in the sulphite process has as its active reagent mainly an acid sulphite compound of calcium. While a comparatively negligible amount of sulphite residual liquor is now treated for use in the tanning industry and for various other purposes, the general practice in the sulphite industry is to discharge the residual liquor into nearby streams or bodies of water. It is well known that the pollution problem resulting from this practice has reached serious proportions and both the industry and governmental authorities have long sought for an economic method of disposing of this residual liquor.

In the manufacture of soda and sulphate pulp the problem of disposing of the residual cooking liquor has been solved by the development of recovery processes wherein the liquor is concentrated and incinerated for the recovery of its heat values by the generation of steam and smelting of its chemical salts to a form suitable for recovery and reuse in the cooking operation. Such processes have been in commercial use for many years and have reached a high stage of recovery efficiency.

As disclosed in my joint application with L. S. Wilcoxson, Serial No. 107,784, filed October 27, 1936, it has been found possible to burn sulphite pulp residual liquor in a self-sustaining combustion process in recovery apparatus of the character disclosed in a prior application of said L. S. Wilcoxson, Serial No. 97,323, filed August 22, 1936, and recover heat and chemical values of the liquor. It was found that with a calcium base sulphite liquor, the chemicals could be recovered in the form of a dry ash consisting principally of calcium carbonate ($CaCO_3$), calcium oxide ($CaO$), and calcium sulphate ($CaSO_4$). No economic method is yet known for transforming the calcium compounds into a condition which would permit their reuse in the pulping process. The disposal of such ash is also a problem because it is liable to contain calcium sulphide which if present tends to combine with the moisture in the air to form hydrogen sulphide gas ($H_2S$) which has a highly objectionable odor.

The use of other acid sulphite compounds has been suggested for the cooking liquor as a substitute for calcium. If, for example, a sodium base residual liquor should be burned as aforesaid the chemical solids may be recovered from the furnace in the form of a smelt containing sodium sulphate ($Na_2SO_4$) and sodium sulphide ($Na_2S$). The sulphate is reducible to the sulphide so that the sulphur in the liquor can be reclaimed mainly in the form of the sulphide. The problem however still remains of converting sodium sulphide into sodium bisulphite ($NaHSO_3$) and as yet no method has been developed by which this can be completely accomplished in a commercial manner. It is generally understood that any sulphide introduced into a sulphite cooking liquor will result in the formation of a colloidal sulphur and the presence of the latter will disadvantageously affect the quality of the pulp produced.

Of the bases other than sodium or calcium that might be used as bisulphite for the extraction of pulp—as for example, strontium, barium, magnesium, zinc—their relatively high cost and/or scarcity, together with the fact that no method has been devised for their recovery, has precluded their commercial consideration. In some cases, however, dolomitic limestone has been used as the source of the base, so that magnesium in varying amounts, in addition to the calcium, is present in the cooking liquor. The presence of the magnesium compounds is generally recognized as beneficial. This is particularly true where the residual liquor from the cooking operation is to be concentrated in an evaporator, since the calcium compounds tend to form an insoluble scale, whereas the magnesium compounds are considerably more soluble. Pure magnesium base sulphite cooking liquor has not been used commercially on account of its much greater cost in the absence of any practical process for the recovery of its chemical content.

The general object of my invention is the provision of a simple and economic cyclic process of manufacturing sulphite pulp from cellulosic fibrous material, and more particularly, a process which is characterized by the efficient recovery of the heat values and recovery and regeneration of the inorganic chemical constituents of the residual pulp liquor for reuse in the process. A further and more specific object is the provision of an improved process of treating the residual liquor resulting from the digestion of cellulosic fibrous material in a pure magnesium base sulphite cooking liquor to recover the heat and chemical values therein.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter.

Of the drawings:

Fig. 1 is a diagrammatic flow sheet illustrating a sulphite pulp process in accordance with my invention;

Fig. 2 is a somewhat diagrammatic sectional elevation of one form of recovery apparatus employed in carrying out the process;

Fig. 3 is a sectional elevation of a modified recovery furnace construction; and Fig. 4 is a transverse section taken on the line 4—4 of Fig. 3.

Calcium, barium, strontium, and magnesium are usually grouped as related metals. It is generally believed that the sulphates of such metals when heated in the presence of carbon will normally be reduced to the corresponding sulphides with the liberation of carbon dioxide. This is true for all the elements of this group, with the exception of magnesium, the sulphate of which under certain conditions, has a greater tendency to reduce directly to the oxide, with the liberation of its sulphur content in the form of sulphur dioxide, and without appreciable formation of the sulphide, i. e. in accordance with the following equation:

$$2MgSO_4 + C = 2MgO + 2SO_2 + CO_2$$

The magnesium sulphate is thus reduced to magnesium oxide with the release of sulphur dioxide and carbon dioxide. In spite of the fact that, according to the literature, difficulty is encountered in carrying out this reaction when the ratio of sulphate to carbon differs materially from that indicated by the equation above, I have discovered that this tendency of magnesium sulphate and similar Mg compounds to reduce to the oxide can be used, under certain conditions, in the manufacture of sulphite pulp. Specifically, when a pure magnesium base sulphite liquor is used, both the base and the sulphur content can be substantially completely recovered from the sulphite residual liquor in a form suitable for use in an economic cyclic process.

In accordance with my invention, and as diagrammatically indicated in Fig. 1, a cooking liquor consisting of a pure acid sulphite compound of magnesium, i. e., magnesium bisulphite, with a substantial excess of sulphur dioxide is supplied to the digester in the usual way. When the cooking operation is completed, the residual liquor is separated from the pulp by diffusion or by means of suitable washing equipment, such as a rotary vacuum filter. The pulp residual liquor with its content of magnesium lignin sulphonate is then neutralized as hereinafter described and delivered to a multiple-effect evaporator wherein it is evaporated to a higher solid concentration, yet one suitable for spraying. Concentrations of 45 to 70% solids are considered suitable. The evaporation of the neutralized liquor is simplified as scaling troubles in the evaporator are virtually eliminated, since most of the magnesium salts present in the residual liquor are readily soluble.

I have found that the residual liquor when concentrated to a degree within the described concentration range can be successfully burned to a dry ash under self-sustaining combustion conditions and its heat and chemical values economically recovered. The ash produced will consist of a mixture of magnesium oxide (MgO) and magnesium carbonate ($MgCO_3$), as well as a small amount of unreduced magnesium sulphate depending upon the reduction efficiency.

The magnesium oxide, however, to be of commercial value in a cyclic process, must be recovered mainly in a form in which it will readily react with sulphurous acid. When magnesium compounds are calcined, two substantially different types of magnesium oxide can be produced. One of these is known as "caustic magnesia" and the other as "dead-burned magnesia," and which type is produced depends mainly upon the time and temperature conditions employed during calcination. In order to produce caustic magnesia, the calcination is usually carried out under temperatures approximating 1800° F. A completely dead-burned product is produced at temperatures approximating 2700° F. The product at the lower temperature has a high reactivity being quickly soluble in weak acids, such as sulphurous acid, and at the higher temperature, the product is only soluble with difficulty in strong acids, and is almost, if not entirely, insoluble in sulphurous acid. As the temperature of calcination rises above 1800° F., the reactivity of the product diminishes down to the point at which it is completely dead-burned.

In addition to the effect of temperature, the time element must also be considered in the production of magnesia. Even at temperatures approximating 1800° F., the reactivity can be seriously impaired if the magnesia is exposed to such a temperature for too long a time. The smaller the particle size, the greater the impairment for a given period. Above 1800° F., unless the time element is extremely short, the chemical reactivity of the product is seriously affected.

A large percentage of the solid content of the residual liquor is in the form of carbon which must be eliminated during the recovery operations to avoid subsequent contamination of the pulp when the recovered ash is used for making fresh cooking liquor. Complete combustion of the carbon content is also desirable to fully utilize the heat value of the liquor.

Recovery of a high percentage of the sulphur content of the liquor is also essential for an economic cyclic process. The sulphur content is initially released as sulphur dioxide ($SO_2$) which is relatively unstable in the presence of oxygen and tends to form other sulphur compounds, such as $SO_3$. While any trioxide in the heating gases formed can be recovered in an absorption tower, it combines to form the sulphate and therefore increases the "dead load" of chemical circulating in the system.

An economic cyclic process of making a pure magnesium base sulphite pulp therefore requires an efficient recovery of the heat and chemical values of the residual liquor, the recovery of the magnesium compounds with a high percentage of magnesia, high reactivity and free from carbon, and the recovery of the sulphur from the heating gases in the form of sulphur dioxide. It has been found however, that the recovery furnace conditions desirable for obtaining some of these results are not suitable for obtaining others. For example, I have found that the highest percentage of reduction tends to occur when a high temperature highly reducing atmosphere is maintained in the furnace. However, high temperature conditions are not suitable for obtaining a highly reactive magnesia, nor is a highly reducing atmosphere suitable for complete combustion of the carbon. Similarly the percentage of $SO_2$ converted into $SO_3$ tends to increase as the amount of excess air present increases and as the temperature decreases.

I have found that the concentrated magnesium base sulphite residual liquor can be successfully burned under self-sustaining combustion conditions and the heat and chemical values recovered in a desirable form by a process involving a two-stage incinerating treatment of the liquor. The concentrated liquor can be incinerated either by dehydrating the liquor to a char and burning the char on a hearth, or by burning the liquor in suspension, each method having special advantages when incinerating a magnesium base sulphite liquor.

In the first or "bed-burning" process, the concentrated residual liquor is delivered to a recovery unit which comprises as its main elements, a water cooled recovery furnace 10, a steam boiler 11, an air heater 12, a dust collector 13, and one or more absorption towers 14, together with the usual forced and/or induced draft fans, pumps, control equipment, and other auxiliaries. The furnace, steam boiler, air heater and dust collector may be constructed and arranged similarly to those disclosed in said joint application with L. S. Wilcoxson, Serial No. 107,784. As disclosed therein, the furnace is preferably of the vertical shaft type with a rectangular horizontal cross-section and a pair of opposite side walls slightly converging towards its bottom. A heating gas outlet 15 is formed in the upper part of the furnace rear wall 16 below the inclined roof 17. The furnace vertical walls and roof are defined and cooled by studded water tubes wholly or partly covered by refractory. In starting up the furnace is first preheated to a predetermined temperature by auxiliary fuel and the concentrated liquor then delivered to a spray nozzle 18 mounted in the furnace front wall 19.

The liquor is discharged by the nozzle 18 in a sheet of relatively large sized particles and the nozzle arranged to oscillate about vertical and horizontal axes to spray the liquor substantially horizontally across the upper section of the furnace against the vertical side and end walls. The liquor is largely dehydrated during its passage and deposits in a slightly sticky condition in successive layers on the side and end walls, forming a mass of dehydrated "char" thereon. The dried char falls in lumps onto the furnace hearth from time to time and as it is highly combustible, readily burns thereon.

The air for combustion is preferably preheated and supplied to the furnace chamber at two levels, primary air being introduced adjacent the hearth through a series of downwardly directed primary air ports 20 in the side and rear walls at a relatively low velocity and secondary air above the level of the mass of char on the walls through secondary air ports 21. Suitable regulating provisions are provided to control the supply of air through each nozzle. The total amount of air supplied to the furnace is preferably only slightly in excess of the theoretical amount of air required for complete combustion of the organic combustible constituents of the liquor. The air supplied is carefully distributed between the primary and secondary air ports, so that about 60–80% of the air is primary air and the balance secondary air, whereby a strongly reducing high temperature atmosphere can be maintained in the lower part of the furnace chamber which forms a primary combustion and reducing zone. The char burns rapidly to an ash residue in the form of light dry unsintered particles containing the chemical solids and a small amount of unburned carbon. The ash collects on the hearth and rapidly builds up in a bed to approximately the level of the primary air ports. Any ash forming above that level is immediately swept up from the bed by the entering primary air streams and carried upwardly by the furnace gases to the furnace outlet. The ash removal from the furnace is thus entirely by flotation in the stream of heating gases, the ash being mainly in the form of small light cenospheres and flakes.

By using a water cooled furnace chamber for the primary combustion and reducing zone, a temperature approximating 2050° F. can be maintained therein. Since the magnesium salts are neither fusible nor volatile at such temperatures, chemical losses in the furnace due to fume formation are avoided and the ash forming on the hearth will be in a dry condition. The furnace conditions described are conducive to a rapid reduction of the magnesium sulphate to magnesium oxide and for the release of the sulphur as sulphur dioxide. The strongly reducing atmosphere maintained in the primary combustion and reducing zone also minimizes the conversion of the sulphur dioxide released to sulphur trioxide. The rapid combustion of the char on the hearth and immediate flight of the ash formed in the rising gas stream limits the time of exposure of the ash to the high temperature conditions in this zone and does not materially affect the reactivity of the ash. The highly reducing atmosphere and the normal presence of a small amount of unburned carbon in the ash particles due thereto also appears to aid in maintaining a high ash reactivity.

The balance of the combustion air is supplied through the secondary air ports 21 and provides a secondary combustion zone in the upper part of the furnace chamber in which any combustible volatiles distilled from the subjacent char on the walls and unburned carbon in the ash suspended in the ascending gases is consumed. The water cooled wall construction in this section permits a temperature approximating 1700° F. to be maintained. Under these conditions the reactivity of the outgoing ash is maintained and conversion of the sulphur dioxide to trioxide minimized.

The ash-laden heating gases pass out of the furnace through a tube screen 25 across the outlet 15 and water cooled throat 26 into the steam boiler 11. The steam boiler employed is preferably of the three-drum type with its two lower drums 27 spaced apart and connected by side-by-side banks of bent tubes 28 to a common upper drum 29. In the steam boiler the gases successively contact with a group of screen tubes 30, superheater tubes 31, and the main banks of steam generating tubes. The employment of a steam boiler of this type facilitates the collection of the ash in that portion of the recovery unit. The ash separating from the gases in the steam boiler being dry and light does not stick to the boiler tubes but drops into a hopper 32 below the boiler bank. The hopper 32 is divided into sections by partitions 33 to prevent by-passing of the gases about the boiler surface and each section or compartment has a valve controlled outlet 33 for the removal of accumulated ash.

On leaving the steam boiler the ash-laden gases pass through the tubes of the tubular air heater 12 to an outlet compartment 34, also provided with a discharge outlet 35 for ash separating in the air heater. Air for the recovery furnace is preheated by contact with the outside of the air heater tubes.

Most of the ash in suspension however is separated in a suitable dust collector 13, such as the cyclone separator illustrated in Figs. 1 and 2. The ash separated out in the cyclone 13 is withdrawn from the bottom thereof through a pipe 43, while the cleaned gases pass upwardly through an inner cone 44 and a conduit 45 to the absorption tower 14. The tower 14 contains a mass of inert interstitial material 46, such as broken brick, field rock, or the like, or a series of grids, so that the gases will be divided into a multiplicity of small streams in passing upwardly through the tower in contact with a descending sulphurous gas absorbing liquid.

I have also found that it is possible to burn the liquor entirely in suspension in a two-stage recovery furnace operation. For suspension burning of the magnesium base sulphite residual liquor I prefer to employ a recovery furnace in which the primary combustion and reducing zone is located in a refractory walled chamber and the secondary combustion zone in a separate water cooled chamber so that the most suitable furnace conditions can be readily maintained for self-sustaining combustion and the production of a chemical ash having a high reduction, high reactivity and a low carbon content, and the recovery of sulphur as sulphur dioxide. The concentrated residual liquor is finely atomized on entering the primary combustion and reducing zone, either by an impinging jet of steam or other atomizing fluid. The furnace employed should be designed as to size, shape and heat absorption surface to effect a normal mean temperature in the primary combustion and reducing zone approximating 1800° F. with the designed normal rate of firing of the sulphite liquor. Combustion air is supplied in regulable quantities and proportioned between the primary combustion and reducing zone and the secondary combustion zone as previously described to provide the desired highly reducing atmosphere in the first zone and a slightly oxidizing atmosphere in the second zone. The finely divided liquor particles on exposure to the furnace conditions in the primary combustion and reducing zone pass rapidly through the successive stages of dehydration, distillation and combustion in transit, burning to a light chemical ash, mainly in the form of small light cenospheres and flakes which remain suspended in the combustion gases and are removed from the furnace entirely by flotation.

The unburned carbon in the ash is burned out while the ash is passing through the secondary combustion zone. Due to the use of a water cooled chamber for this zone, a normal mean temperature approximating 1950° F. can be readily maintained therein, thereby minimizing the effect on the ash reactivity and the formation of sulphur trioxide in this zone. The ash-laden gases on leaving the secondary combustion zone flow through suitable heat absorbing and ash separation apparatus as previously described.

With the liquor burned in suspension to a light ash in an atmosphere of upflowing heating gases in the furnace chamber, little, if any, of the ash will drop to the bottom of the chamber and substantially all of the ash will rapidly pass out with the heating gases. All of the liquor particles will be subjected to substantially the same conditions while in the furnace, contributing to stable operation and uniform removal of the ash. Under these conditions the period during which the liquor particles and resulting ash is exposed to the furnace temperature conditions will be extremely short and dead-burning virtually eliminated.

By way of example and not of limitation, I have illustrated in Figs. 3 and 4 an experimental recovery furnace in which the described method of burning magnesium base sulphite residual liquor in suspension has been successfully carried out. The recovery furnace shown consists of a refractory walled furnace including a front wall 60, rear wall 61, and side walls 62, with the space therebetween divided into serially connected elongated gas passes or chambers 63, 64, 65, and 66 by a vertical bridge wall 69, a vertical partition 67, and a horizontal arch 68. The chamber 66 is horizontally elongated between the arch 68 and the underside of the horizontally arranged fire tube boiler 70. The chambers 63 and 64 are thus entirely refractory walled, while the chambers 65 and 66 have a substantial water cooled wall area. A pair of steam atomizing liquor nozzles 71 are arranged in the upper part of the front wall 60 at laterally spaced points. Primary air supply pipes 72 open through the front wall above the corresponding nozzles 71 for supplying combustion air to corresponding refractory hoods 73 arranged to direct the primary air downwardly between the streams of atomized liquor discharged from the nozzles 71 and the front wall 60. Additional primary air supply pipes 74 are located in the lower part of the front wall, and directed downwardly to direct a stream of primary air rearwardly across the floor 75 which is air cooled. A pair of vertically spaced horizontally arranged secondary air pipes 76 extend across a pair of openings 77 in the bottom of the partition 67 with the discharge openings in the pipes oppositely directed to cause an intimate mixture of the secondary air and gases passing through the openings 77. A collecting hopper 78 is arranged below the front end of the chamber 66 which extends beyond the front wall 60. Heating gases from the chamber 66 flow over the hopper 78 and turn upwardly into the front end of the fire tube boiler 70, passing through the boiler tubes 80 to a gas exit flue 81 at its rear end. The test apparatus was constructed with the approximate dimensions indicated in Figs. 3 and 4.

In one firing run in the described test apparatus a pure magnesium base sulphite residual liquor having a concentration of 32.6° Baumé at 62° F. was supplied to the liquor nozzles 71 at a pressure of 16 lbs. per square inch gage and a temperature of 170° F. The liquor atomized fluid was saturated steam at a pressure of 40 lbs. per square inch gage. The residual liquor had a solid content of 55% with an ultimate analysis of

| | Per cent |
|---|---|
| Carbon | 45 |
| Hydrogen | 4.5 |
| Sulphur | 4 |
| Ash | 13 |
| Oxygen+nitrogen (by difference) | 33.5 |

The heat value of the liquor on a dry basis was 7600 B. T. U./lb. The residual liquor was supplied to the nozzles 71 at the rate of 3200 lbs./hr. Combustion air was supplied to the primary air pipes 72 and 74 and secondary air to the pipes 76 at a temperature of 210° F., with the total supply of air to the furnace ranging from 102 to 116% of the theoretical air requirements for combustion. 70% of the air was supplied through the pipes 72, 15% through the pipes 74 and 15% through the pipes 76. A slight negative pressure was present in the furnace.

In operation the residual liquor was downwardly directed in finely atomized streams by the nozzles 71 and burned in suspension while in a U-shaped flame path in the chamber 63 and while in the chamber 64. These chambers form the primary combustion and reducing zone of the unit, and the temperature conditions therein were as indicated in Fig. 3. As the ash-laden furnace gases passed through the openings 77, the additional combustion air supplied at this point caused further combustion in the water cooled chambers 65 and 66 of any unburned carbon present. The furnace temperatures in the secondary combustion zone formed by the chambers 65 and 66 were maintained within the desired range by the relatively large amount of water cooled surface effective therein as indicated by the temperatures noted in Fig. 3. The steam production in the various test runs averaged approximately 2 lbs. of steam per pound of liquor fired. The flue gases had the following average analysis:

| | Per cent |
|---|---|
| $CO_2$ | 17.7 |
| O | 2.4 |
| $CO_2$ | .6 |
| CO | — |

The average time of travel through the test unit was computed to be between three and four seconds.

The ash carried out of the furnace by flotation in the furnace gases was separated in a cyclone separator and an analysis showed a reduction of 93 to 94½%, a reactivity slightly higher than that of the commercial caustic magnesia used in making the original cooking liquor, and a carbon content of from zero to .5%. The ash produced was mainly in the form of light cenospheres and flakes having a density of from three to eight lbs./cu. ft., the density increasing as the reactivity decreased.

The ash recovered in the separating and collecting apparatus is advantageously divided into two parts on leaving the solution tank. One portion is fed back into the residual liquor prior to its evaporation for the purpose of neutralizing its acid content. By this step, loss of sulphur during the evaporation step is eliminated and necessity for acid resisting material for the evaporator is minimized.

The other portion of the ash is supplied through a pipe 47 to the top of the absorption tower 14. The difficulties of recovering low percentages of $SO_2$ in the flue gas are largely eliminated when the recovered magnesia is sufficiently reactive. The magnesia combines with the sulphur dioxide in the ascending gases to form magnesium sulphite and bisulphite. The flow of gas absorbing liquor is so regulated and controlled through the absorption tower that only a negligible amount of sulphur escapes in the gases. In test runs with the experimental unit described, gas analyses showed that over 90% of the sulphur content of the residual liquor was recovered by the absorption tower. Not only are the sulphur constituents of the gases recovered in the absorption tower, but also any solids remaining in the gases. The liquor with its sulphur content increased is withdrawn from the bottom of the absorption tower through a pipe 48, while the clean gases pass through an induced draft fan 49 to the stack.

In view of the necessity for permitting the ash to remain in the furnace chamber for only a brief period to avoid dead-burning thereof and the desirability of limiting the amount of combustion air to the furnace, a small amount of unburned carbon particles may be carried out with the ash in the heating gases. Such impurities would be immaterial in the portion of the ash employed for neutralizing the liquor before evaporation, but must be eliminated before reuse of the recovered chemicals in the digester to avoid contamination of the pulp. Accordingly, the liquor withdrawn from the absorption tower discharge pipe 48 is passed through a suitable filter, such as a sand filter, to remove any carbon particles present in the liquor.

The filtered liquor is delivered to a storage place, and as required is supplied to the cooking acid tank. Magnesia losses in the system are made up by introducing magnesium sulphate into the liquor before burning or by introducing magnesium carbonate or oxide along with the ash. When the sulphate is employed for this purpose it also assists at the same time in maintaining the sulphur balance. The burning of a small amount of sulphur is usually required however in order to maintain this condition, and this may be added in an absorption tower before delivery of the sulphite liquor to the cooking acid tank. The sulphite liquor formed is fortified in the usual way by introducing into it the sulphur dioxide relieved and recovered from the digester during the cooking operation. The liquor is then ready to enter upon a fresh cycle.

The substitution of a magnesium base involves no change in the usual sulphite cooking practice. In producing a ton of sulphite pulp at least a similar quantity of material is dissolved out of the wood and remains in the liquor. At the same time approximately 200 pounds of sulphur along with about 300 pounds of the base when calculated as calcium carbonate remain in the solution and are normally lost. By means of the described process a high percentage of both the sulphur and base can be directly recovered for reuse in the pulping process. At the same time the combustion of the organic constituents of the residual liquor will produce an amount of steam substantially in excess of the requirements of the pulping process including the recovery step. The magnesium base pulp produced has been found to be equal to and in some respects superior to calcium base sulphite pulp from the same woods. For the same ratio of total sulphur to combined sulphur in the cooking liquor, the magnesium base pulp has been found to have a slightly better color and to require a lesser amount of bleaching material.

It can therefore be seen that this process offers substantial economic advantages in addition to providing a complete solution to the problem of residual sulphite liquor disposal.

This application is a continuation in part of my prior application Serial No. 107,785, filed Oct. 27, 1936.

While in accordance with the provisions of the statutes I have disclosed herein the best embodiments of my invention now known to me, those skilled in the art will understand that changes may be made without departing from the spirit of the invention covered by my claims, and that certain features of my invention may

I claim:

1. The process of treating the residual liquor resulting from the digestion of cellulosic fibrous material in a relatively pure magnesium base sulphite cooking liquor which comprises spraying the residual liquor into a high temperature furnace chamber, burning the residual liquor so introduced therein while maintaining a furnace temperature below the fusion temperature of the non-combustible constituents of the liquor to yield a dry unsintered solid residue containing a relatively high proportion of caustic magnesia and removing substantially all of the residue produced from the combustion zone by flotation in the gaseous products of combustion in such a brief period of time that the dwell of the residue within the combustion zone is insufficient to effect dead-burning of the magnesia in the residue.

2. The process of treating the residual liquor resulting from the digestion of cellulosic fibrous material in a relatively pure magnesium base sulphite cooking liquor which comprises concentrating the residual liquor to a concentration within the range of 45–70% solids, introducing the concentrated liquor into a high temperature furnace chamber in a finely divided condition, burning the residual liquor so introduced therein while maintaining a furnace temperature below the fusion temperature of the non-combustible constituents of the liquor to yield a dry unsintered solid residue containing a relatively high proportion of caustic magnesium oxide, and removing substantially all of the residue produced from the combustion zone by flotation in the gaseous products of combustion in such a brief period of time that the dwell of the residue within the combustion zone is insufficient to effect dead-burning of the magnesium oxide in the residue.

3. The process of treating the residual liquor resulting from the digestion of cellulosic fibrous material in a relatively pure magnesium base sulphite cooking liquor which comprises concentrating the residual liquor to a concentration within the range of 45–70% solids, continuously introducing the concentrated liquor into a high temperature furnace chamber, continuously burning the residual liquor so introduced therein in suspension under self-sustaining combustion conditions while maintaining a furnace temperature below the fusion temperature of the non-combustible constituents of the liquor to yield a dry unsintered solid residue containing mainly caustic magnesium oxide, and removing substantially all of the residue produced from the combustion zone by flotation in the gaseous products of combustion in such a brief period of time that the dwell of the residue within the combustion zone is insufficient to effect dead-burning of the magnesium oxide in the residue.

4. The process of treating the residual liquor resulting from the digestion of cellulosic fibrous material in a relatively pure magnesium base sulphite cooking liquor which comprises concentrating the residual liquor to a concentration within the range of 45–70% solids, spraying the concentrated liquor into a high temperature furnace chamber, burning the concentrated liquor so introduced therein in suspension while maintaining a furnace temperature sufficient to maintain self-sustaining combustion conditions and yet below the fusion temperature of the non-combustible constituents of the liquor to yield a dry solid residue containing a relatively high proportion of caustic magnesia, removing the solid residue from the furnace chamber by flotation in the gaseous products of combustion in such a brief period of time that the dwell of the residue within the combustion zone is insufficient to effect dead-burning of the magnesia in the residue, and treating the residue removed to form fresh magnesium base sulphite cooking liquor.

5. The process of treating the residual liquor resulting from the digestion of celulosic fibrous material in a pure magnesium bisulphite cooking liquor which comprises concentrating the residual liquor to a concentration within the range of 45–70% solids, introducing the concentrated liquor into a high temperature furnace chamber, dehydrating and burning the concentrated liquor so introduced therein while maintaining a furnace temperature below the fusion temperature of the non-combustible constituents of the liquor to yield a dry solid residue containing mainly magnesium oxide, utilizing the gaseous products of combustion for the dehydration of concentrated liquor subsequently introduced, continuously removing the solid residue from the furnace chamber by flotation in the gaseous products of combustion in such a brief period of time that the dwell of the residue within the combustion zone is insufficient to effect dead-burning of the magnesium oxide in the residue, and treating the residue removed to form fresh magnesium bisulphite cooking liquor.

6. The process of treating the residual liquor resulting from the digestion of cellulosic fibrous material in a relatively pure magnesium base sulphite cooking liquor which comprises concentrating the residual liquor to a concentration within the range of 45–70% solids, introducing the concentrated liquor into a high temperature furnace chamber, dehydrating and burning the concentrated liquor so introduced therein while maintaining a furnace temperature below the fusion temperature of the non-combustible constituents of the liquor to yield a dry solid residue containing a relatively high proportion of caustic magnesium oxide and to release sulphur dioxide, removing the residue from the furnace chamber by flotation in the gaseous products of combustion in such a brief period of time that the dwell of the residue within the combustion zone is insufficient to effect dead-burning of the magnesium oxide in the residue, treating the residue removed with water to produce an alkaline liquor containing the recovered magnesium compounds, and absorbing sulphur dioxide from the gases leaving the furnace by contact with the alkaline liquor thus produced.

7. The process of treating the residual liquor resulting from the digestion of cellulosic fibrous material in a relatively pure magnesium base sulphite cooking liquor which comprises concentrating the residual liquor to a concentration within the range of 45–70% solids, continuously introducing the concentrated liquor into a high temperature furnace chamber, dehydrating and burning the concentrated liquor so introduced therein while maintaining a reducing atmosphere and a furnace temperature below the fusion temperature of the non-combustible constituents of the liquor to yield a dry solid residue containing mainly magnesium oxide and to release sulphur dioxide, continuously removing the residue from the furnace chamber by flotation in the gaseous products of combustion in such a brief period of time that the dwell of the residue within the combustion zone is insufficient to effect dead-burning of the magnesium oxide in the residue, treating the residue removed with water to produce an alkaline liquor containing the recovered magnesium compounds, and absorbing sulphur dioxide from the gases leaving the furnace by contact with the alkaline liquor thus produced.

8. The process of treating the residual liquor resulting from the digestion of cellulosic fibrous material in a relatively pure magnesium base sulphite cooking liquor which comprises spraying the liquor into a furnace chamber, burning the liquor so introduced therein in suspension while maintaining a period of exposure of the non-combustible constituents of the liquor therein and a mean furnace temperature yielding a dry unsintered solid residue containing mainly caustic magnesium oxide, and removing substantially all of the residue produced from the combustion zone by flotation in the gaseous products of combustion in such a brief period of time that the dwell of the residue within the combustion zone is insufficient to effect dead-burning of the magnesium oxide in the residue.

9. The process of treating the residual liquor resulting from the digestion of cellulosic fibrous material in a relatively pure magnesium base sulphite cooking liquor which comprises dehydrating the residual liquor to a concentration within the range of 45-70% solids, burning the dehydrated liquor in a furnace chamber while maintaining a reducing atmosphere and a mean furnace temperature therein yielding a dry unsintered solid residue containing mainly caustic magnesium oxide, and removing substantially all of the residue produced from the combustion zone by flotation in the gaseous products of combustion in such a brief period of time that the dwell of the residue within the combustion zone is insufficient to effect dead-burning of the magnesium oxide in the residue.

10. The process of treating the residual liquor resulting from the digestion of cellulosic fibrous material in a relatively pure magnesium base sulphite cooking liquor which comprises concentrating the residual liquor to a concentration within the range of 45-70% solids, introducing the concentrated liquor into a furnace chamber, and burning the concentrated liquor so introduced therein in suspension while maintaining a mean furnace temperature approximating 1800° F. to yield a dry unsintered solid residue containing mainly caustic magnesium oxide.

11. The process of treating the residual liquor resulting from the digestion of cellulosic fibrous material in a pure magnesium bisulphite cooking liquor which comprises concentrating the residual liquor to a concentration within the range of 45-70% solids, introducing the concentrated liquor into a furnace chamber in a finely divided atomized spray, burning the concentrated liquor so introduced in suspension therein while maintaining a period of exposure of the non-combustible constituents of the liquor therein and a mean furnace temperature sufficient to maintain self-sustaining combustion conditions and yet below the fusion temperature of the non-combustible constituents of the liquor to yield a dry solid residue containing mainly caustic magnesium oxide, and removing substantially all of the residue produced from the combustion zone by flotation in the gaseous products of combustion in such a brief period of time that the dwell of the residue within the combustion zone is insufficient to effect dead-burning of the magnesium oxide in the residue.

12. The process of treating the residual liquor resulting from the digestion of cellulosic fibrous material in a magnesium base sulphite cooking liquor which comprises concentrating the residual liquor to a concentration within the range of 45-70% solids, introducing the concentrated liquor into the upper portion of a furnace chamber in a relatively coarse spray, dehydrating the concentrated liquor so introduced, and burning the dehydrated material in the lower portion of the furnace chamber while maintaining a reducing atmosphere and a mean furnace temperature approximating 1800° F. to yield a dry solid residue containing caustic magnesium oxide.

13. The process of treating the residual liquor resulting from the digestion of cellulosic fibrous material in a magnesium base sulphite cooking liquor which comprises concentrating the residual liquor to a concentration within the range of 45-70% solids, introducing the concentrated liquor into a furnace chamber in a finely divided atomized spray, burning the concentrated liquor so introduced in suspension therein while maintaining a furnace temperature sufficient to maintain self-sustaining combustion conditions and yet below the fusion temperature of the non-combustible constituents of the liquor to yield a dry unsintered solid residue containing mainly magnesium oxide in a highly reactive state, withdrawing the residue from the furnace chamber by flotation in the gaseous products of combustion in such a brief period of time that the dwell of the residue within the combustion zone is insufficient to effect dead-burning of the magnesium oxide in the residue, treating the residue removed to produce an alkaline liquor, and treating the alkaline liquor to form fresh magnesium base cooking liquor.

14. The process of treating the residual liquor resulting from the digestion of cellulosic fibrous material in a magnesium base sulphite cooking liquor which comprises concentrating the residual liquor to a concentration within the range of 45-70% solids, introducing the concentrated liquor into a furnace chamber in a finely divided atomized spray, burning the concentrated liquor so introduced in suspension therein while maintaining a reducing atmosphere and a mean furnace temperature approximately 1800° F. to yield a dry solid residue containing mainly caustic magnesium oxide in a highly reactive state, continuously withdrawing the residue from the furnace chamber, treating the residue removed to produce a sulphited liquor, filtering the liquor produced to eliminate unburnt carbon particles, and treating the filtered liquor to form fresh magnesium base cooking liquor.

15. The process of treating residual liquor resulting from the digestion of cellulosic fibrous material in a relatively pure magnesium base sulphite cooking liquor which comprises dehydrating the liquor, burning the dehydrated liquor in a primary combustion and reducing zone while maintaining a temperature and atmosphere therein yielding a dry ash containing a high percentage of reduced magnesium compounds, withdrawing the ash from the primary combustion and reducing zone through a secondary combustion zone by flotation in the combustion gases, supplying combustion air to the zones and proportioning the same between the zones to provide a reducing atmosphere in the primary combustion and reducing zone and to provide an atmosphere in the secondary combustion zone sufficiently oxidizing to complete the combustion therein of any unburned combustibles in the combustion gases, recovering the ash from the combustion gases, and treating the recovered ash to form fresh magnesium base cooking liquor.

16. The process of treating residual liquor resulting from the digestion of cellulosic fibrous material in a relatively pure magnesium bisulphite cooking liquor which comprises concentrating the residual liquor, introducing the concentrated liquor into a primary combustion and reducing zone in a finely divided spray, burning the concentrated liquor so introduced therein in suspension while maintaining a temperature and atmosphere therein yielding a dry ash containing a high percentage of reduced magnesium compounds, withdrawing the ash from the primary combustion and reducing zone through a secondary combustion zone by flotation in the combustion gases, supplying combustion air to the zones and proportioning the same between the zones to provide a strongly reducing atmosphere in the primary combustion and reducing zone and to provide a slightly oxidizing atmosphere in the secondary combustion zone sufficient to complete the combustion in suspension of any unburned combustibles in the combustion gases, recovering the ash from the combustion gases, and treating the recovered ash to form fresh magnesium bisulphide cooking liquor.

17. The process of treating residual liquor resulting from the digestion of cellulosic fibrous material in a relatively pure magnesium base sulphite cooking liquor which comprises concentrating the residual liquor, introducing the concentrated liquor into a primary combustion and reducing zone in a relatively coarse spray, dehydrating the sprayed liquor to a combustible char, burning the char on a hearth therein while maintaining a temperature and atmosphere therein yielding a dry ash containing a high percentage of reduced magnesium compounds, withdrawing the ash from the primary combustion and reducing zone through a secondary combustion zone by flotation in the combustion gases, supplying combustion air slightly in excess of the theoretical combustion requirements and proportioning the same between the zones to provide a strongly reducing atmosphere in the primary combustion and reducing zone and to provide a slightly oxidizing atmosphere in the secondary combustion zone sufficient to complete the combustion in suspension of any unburned combustibles in the combustion gases, recovering the ash from the combustion gases, and treating the recovered ash to form fresh magnesium base cooking liquor.

18. The process of treating residual liquor resulting from the digestion of cellulosic fibrous material in a relatively pure magnesium base sulphite cooking liquor which comprises introducing the liquor into a primary combustion and reducing zone, burning the liquor so introduced therein while maintaining a temperature and atmosphere therein yielding a dry ash containing a high percentage of reduced magnesium compounds, withdrawing the ash from the primary combustion and reducing zone through a secondary combustion zone by flotation in the combustion gases, supplying combustion air to the zones and proportioning the same between the zones to provide a reducing atmosphere in the primary combustion and reducing zone and to provide an atmosphere in the secondary combustion zone sufficiently oxidizing to complete the combustion therein of any unburned combustibles in the combustion gases, recovering the ash from the combustion gases, and treating the recovered ash to form fresh magnesium base cooking liquor.

19. The method of recovering chemicals from a relatively pure magnesia base waste sulphite pulp liquor which comprises burning the combustible organic constituents of the liquor in suspension under self-sustaining combustion conditions and yet at a temperature below the fusion temperature of the non-combustible constituents of the liquor to yield a dry unsintered ash containing a high percentage of caustic magnesia, and removing substantially all of the ash produced from the combustion zone by flotation in the gaseous products of combustion in such a brief period of time that the dwell of the ash within the combustion zone is insufficient to effect dead-burning of the magnesia in the ash.

20. The method of recovering chemicals from a relatively pure magnesia base waste sulphite pulp liquor which comprises burning the combustible organic constituents of the liquor in suspension to yield a dry unsintered ash containing a high percentage of caustic magnesia and gaseous products of combustion containing $SO_2$, removing substantially all of the ash produced from the combustion zone by flotation in the gaseous products of combustion in such a brief period of time that the dwell of the ash within the combustion zone is insufficient to effect dead-burning of the magnesia in the ash, and rapidly reducing the temperature of the gaseous products of combustion and suspended ash on leaving the combustion zone to minimize the conversion of $SO_2$ to $SO_3$.

21. The method of recovering chemicals from a relatively pure magnesia base waste sulphite pulp liquor which comprises concentrating the liquor to a concentration within the range of 45–70% solids, spraying the concentrated liquor into a combustion zone in a finely atomized condition and burning the combustible organic constituents of the liquor in suspension to yield a dry ash containing a high percentage of caustic magnesia, and removing substantially all of the ash produced from the combustion zone by flotation in the gaseous products of combustion in such a brief period of time that the dwell of the ash within the combustion zone is insufficient to effect dead-burning of the magnesia in the ash.

22. The method of recovering chemicals from a relatively pure magnesia base waste sulphite pulp liquor which comprises concentrating the liquor to a concentration within the range of 45–70% solids, spraying the concentrated liquor into a combustion zone in a finely atomized condition and burning the combustible organic constituents of the liquor in suspension under self-sustaining combustion conditions in a reducing atmosphere and completing combustion in an oxidizing atmosphere to yield a dry unsintered ash containing a high percentage of caustic magnesia, and removing substantially all of the ash produced from the combustion zone by flotation in the gaseous products of combustion in such a brief period of time that the dwell of the ash within the oxidizing combustion zone is insufficient to effect dead burning of the magnesia in the ash.

23. The method of recovering chemicals from a relatively pure magnesia base waste sulphite pulp liquor which comprises concentrating the liquor to a concentration within the range of 45–70% solids, spraying the concentrated liquor into a combustion zone in a finely atomized condition and burning the combustible organic constituents of the liquor in suspension under self-sustaining combustion conditions to yield a dry ash containing a high percentage of caustic magnesia suspended in gaseous products of combustion including sulphur dioxide, and rapidly reducing the temperature of the gaseous products of combustion and suspended ash on leaving the combustion zone such that the time of exposure of the ash to high temperature conditions is insufficient to effect dead-burning of the magnesia in the ash.

24. The method of treating magnesia base waste sulphite pulp liquor which comprises concentrating the waste liquor, dehydrating and burning the combustible organic constituents of the concentrated liquor in suspension to obtain a dry unsintered ash consisting mainly of caustic magnesium oxide and combustion gases containing $SO_2$, removing substantially all of the ash produced from the combustion zone by flotation in the gaseous products of combustion in such a brief period of time that the dwell of the ash within the combustion zone is insufficient to effect dead-burning of the magnesium oxide in the ash, mixing the caustic magnesium oxide ash with water to produce an alkaline magnesia medium, and absorbing the $SO_2$ in the combustion gases by contact with said alkaline magnesia medium to form fresh magnesium sulphite liquor.

GEORGE H. TOMLINSON.

CERTIFICATE OF CORRECTION.

Patent No. 2,285,876. June 9, 1942.

GEORGE H. TOMLINSON.

It is hereby certified that error appears in the printed specification of the above numbered patent requiring correction as follows: Page 1, first column, line 4, for "liquid" read --liquor--; page 4, second column, line 58, for the word "atomized" read --atomizing--; page 5, first column, line 31, for "$CO_2$" read --$SO_2$--; and that the said Letters Patent should be read with this correction therein that the same may conform to the record of the case in the Patent Office.

Signed and sealed this 4th day of August, A. D. 1942.

(Seal)

Henry Van Arsdale,
Acting Commissioner of Patents.